May 31, 1938.  P. O. CHAMBERS  2,119,467
TIRE RECAPPING EQUIPMENT
Filed Feb. 17, 1938
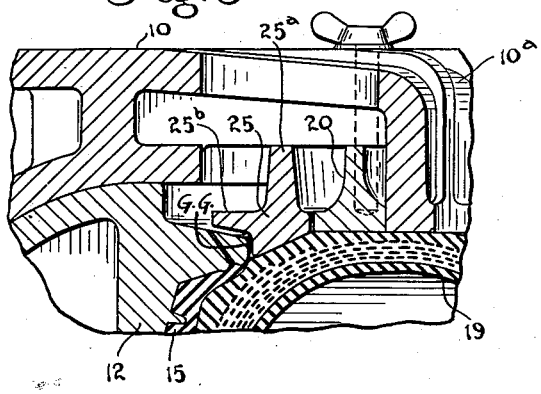
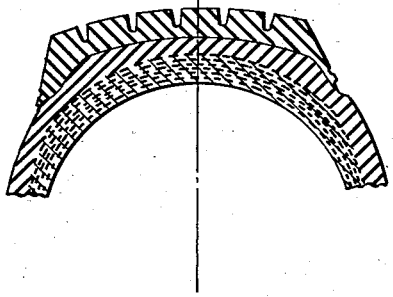
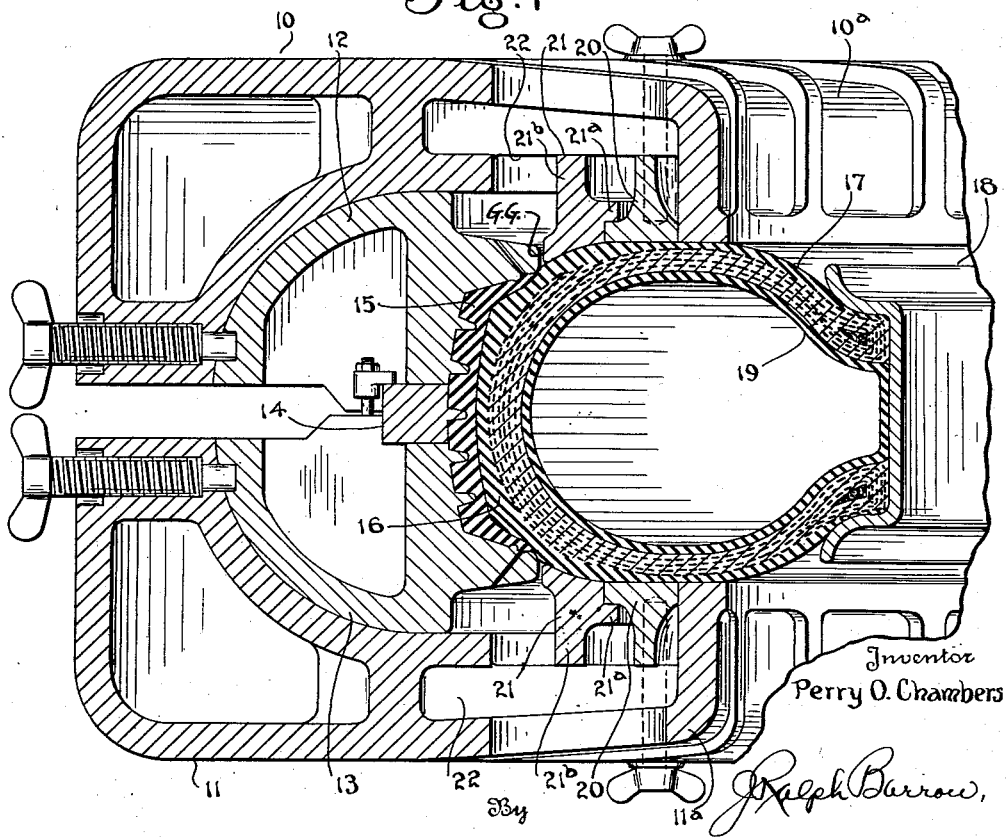
Inventor
Perry O. Chambers
By Ralph Barrow,
Attorney Patented May 31, 1938

2,119,467

UNITED STATES PATENT OFFICE 2,119,467

TIRE RECAPPING EQUIPMENT

Perry O. Chambers, Chicago, Ill., assignor to Safety Vulcanizer Company, Inc., Chicago, Ill., a corporation of Illinois Application February 17, 1938, Serial No. 190,978

6 Claims. (Cl. 18—18)

This invention relates to tire re-capping equipment.

Heretofore, tire re-capping equipment has comprised a heated tread matrix designed to cooperate only with the tread portion of the tire for vulcanizing new rubber onto said tread portion. Cold side-wall supporting rings have been associated with said tread matrix and spaced inwardly substantial distances therefrom. This has exposed substantial surfaces of the tire sides between the side rings and the re-capping matrix to radiate heat therefrom for the purpose of confining the vulcanizing heat to the tread only.

Re-capped tires have not heretofore been entirely satisfactory because of off-center and crooked treads. They are nearly all off-center from $\frac{1}{16}$″ to $\frac{1}{2}$″ in the direction of the bottom half of the re-capping vulcanizer. Many treads are also wavy or snaky circumferentially about the tire.

Blowouts and separation occur frequently in the circumferential areas on the sides of the tire which were exposed during the vulcanization. This is believed to be due to lack of restraining pressure on the outside of the tire permitting the rubber adjacent the tread to swell and become slightly porous during the heating process and thus weakening the fabric structure at these acreas.

By confining the heat to the tread the rubber does not soften and flow in adjacent areas of the tire sufficiently to permit sufficient re-alignment of the cords in the carcass whereby the tire will be effectively vulcanized in a mold different than the original without setting up conflicting stresses in the tire which may result in premature failure.

The general purpose of the present invention is to provide outwardly converging side-wall rings for use in a re-capping vulcanizer which extend closely adjacent the re-capping matrix and engage the side-walls adjacent the tread to force the tire to enter the matrix and to retain the same properly centered therein during vulcanization, whereby the re-capped treads will be in perfect alignment, the rubber in the side-walls will be prevented from swelling and weakening the carcass and the heat from the tread will penetrate farther down the tire in gradually decreasing amount permitting a natural realignment of the cords in the tire and avoiding localized conflicting stresses.

The foregoing and other objects of the invention are attained in the re-capping vulcanizer illustrated in the accompanying drawing and described below. It is to be understood that the invention is not limited to the specific form thereof shown and described.

Of the accompanying drawing,

Figure 1 is a radial section through a known type of re-capping vulcanizer with the improvement of the present invention incorporated therein.

Figure 2 is a radial section through the tread portion of a re-capped tire showing an off-center tread such as has been heretofore produced.

Figure 3 is a part radial section through a vulcanizer showing a modified form of the invention.

Referring to the accompanying drawing, the numerals 10 and 11 indicate respectively upper and lower annular vulcanizer sections arranged to be heated in any suitable manner and removably receiving and retaining therein annular re-capping matrix sections 12 and 13 respectively, with or without a spacer ring 14 arranged between said matrix sections.

The matrix comprising parts 12, 13 and 14 is designed to embrace only the tread portion of a tire from shoulder to shoulder as shown to vulcanize new rubber 15 onto the old rubber 16 of a tire 17. During a vulcanizing operation tire 17 is mounted on a rim 18 with a pressure bag or tube 19 therein which is expanded by internal fluid pressure after the tire 17 is placed into the vulcanizer as shown to force the new tread rubber 15 into the recesses in the matrix.

The vulcanizer of the type shown has usually utilized side wall rings 20, 20 but nevertheless such vulcanizers have produced off-center treads such as shown in Figure 2 and tires with the other defects noted in the opening paragraphs of this specification.

To obviate these defects, rings 21, 21 are provided which extend closely adjacent the tread matrix but out of contact therewith whereby effective re-capping vulcanization is secured of the new rubber 15 to the old rubber 16 with the new tread perfectly centered, but with sufficient pressure being maintained on the side-walls of the tire adjacent the tread to avoid swelling of the rubber and weakening of the carcass and also with sufficient penetration of heat to the carcass, tapering away from the tread, of course, to permit such realignment of cords in the carcass as to avoid localized conflicting stresses. The spacing of the centering rings 21 from the tread matrix provides gaps G. G. which result in the centering rings being of substantially less temperature than the tread matrix but the gaps G. G. are of insufficient width to permit bulging of the carcass of the tire between the centering rings and the matrix.

It will be understood that rings 21 may be integral with rings 20, but, if not, may have portions 21a embracing rings 20 and portions 21b for supporting the same on radial webs 22 inside of the skirt portions 10a and 11a of the vulcanizer sections. A modified tread-centering ring is shown at 25 in Figure 3 which has a portion 25a similar to portion 21b of ring 21 and a portion 25b embracing the tread matrix, but not contacting the same during vulcanization, being held in spaced relation by the internal pressure in the tire.

The use of the above-described vulcanizer will be understood by skilled artisans. The rings 21 or 25 will be retained in the vulcanizer sections assembled with the tread matrix and the rings 20 and will serve to hold the tread of the tire properly centered in the matrix to confine the side-walls against swelling and prevent porosity therein and to cause effective cord realignment.

Modifications of the invention other than those disclosed herein may be resorted to without departing from the spirit thereof or the scope of the appended claims.

What is claimed is:

1. A vulcanizer for re-capping tires, comprising cooperating vulcanizer sections, means for supporting and inflating a tire therein, a tread matrix supported in said sections for embracing the tread rubber only of a tire therein, means for heating said tread matrix, side-wall supporting plates associated with said vulcanizer a substantial distance inwardly of the tread matrix and outwardly converging plates for engaging the side-walls of the tire adjacent the tread and between the side-wall plates and the tread matrix for centering a tire tread in said matrix and supporting it against off-center movement until a new tread is vulcanized on the tire, there being gaps of such width between the tread matrix and the centering plates as to result in the latter being of less temperature but preventing bulging of the tire therebetween.

2. A vulcanizer for re-capping tires, comprising cooperating vulcanizer sections, means for supporting and inflating a tire therein, a tread matrix supported in said sections for embracing the tread rubber only of a tire therein, means for heating said tread matrix, side-wall supporting plates associated with said vulcanizer a substantial distance inwardly of the tread matrix and outwardly converging plates for engaging the side-walls of the tire adjacent the tread and between the side-wall plates and the tread matrix for centering a tire tread in said matrix and supporting it against off-center movement until a new tread is vulcanized on the tire, said vulcanizer sections having inwardly extending skirts, means for retaining said side-wall plates in said skirts, and means for retaining said centering plates between the side-wall plates and the tread matrix, there being gaps between the centering plates and the tread matrix of such width as to prevent bulging of the tire therebetween but sufficient to result in a lesser heat being applied to the tire at the centering plates than applied to the new tread rubber, such heat being applied as will soften the rubber adjacent the tread to relieve localized stresses adjacent the tread.

3. A vulcanizer for re-capping tires, comprising cooperating vulcanizer sections, means for supporting and inflating a tire therein, a tread matrix supported in said sections for embracing the tread rubber only of a tire therein, means for applying heat to said tread matrix, side-wall supporting plates associated with said vulcanizer a substantial distance inwardly of the tread matrix and outwardly converging plates between the side-wall supporting plates and the matrix for engaging the side-walls of the tire adjacent the tread between the side-wall plates and the tread matrix for centering a tire tread in said matrix and supporting it against off-center movement until a new tread is vulcanized on the tire, there being gaps between the centering plates and the matrix of such width as to prevent bulging of the tire therebetween but resulting in application of a lower temperature to the tire inwardly of the gaps than that applied to the tread matrix.

4. A tire re-capping vulcanizer including cooperating annular vulcanizer sections, means for supporting and inflating a tire therein, a tread matrix carried thereby for engaging the tread rubber only of a tire to be re-capped, means to apply heat to said tread matrix, and outwardly converging side-wall engaging plates supported in said vulcanizer out of contact with but closely adjacent said matrix for centering, and holding centered, a tire to be re-capped in said vulcanizer without permitting the tire to bulge between the centering plates and the matrix.

5. A tire re-capping vulcanizer including cooperating annular vulcanizer sections, means for supporting and inflating a tire therein, a tread matrix carried thereby for engaging the tread rubber only of a tire to be re-capped, means to apply heat to said tread matrix, and outwardly converging side-wall engaging plates supported in said vulcanizer out of contact with but closely adjacent said matrix for centering, and holding centered, a tire to be re-capped in said vulcanizer, there being gaps between the tread matrix and the converging side-wall engaging plates of such width as to prevent bulging of a tire therebetween but resulting in application of a lower temperature to the tire inwardly of the gaps than that applied to the tire by the tread matrix.

6. The combination in a horizontal annular tire re-capping vulcanizer of a tread matrix for embracing the tread rubber only of a tire therein, means for applying heat to said tread matrix, means for supporting and inflating a tire therein, and side-wall engaging plates adjacent said tread matrix converging outwardly substantially to the contour of the outer portions of the side-walls of said tire for centering a tire respecting said matrix and against which side-wall engaging plates the tire is inflated during vulcanization, there being gaps between said side-wall engaging plates and said tread matrix of such width as to prevent bulging of a tire therebetween and causing said centering plates to be of substantially less temperature than the tread matrix but yet sufficiently hot to cause some softening of the rubber of the tire adjacent the tread to permit readjustment in the carcass of the tire to the newly applied tread.

PERRY O. CHAMBERS.